(12) United States Patent
Han

(10) Patent No.: US 10,630,857 B2
(45) Date of Patent: Apr. 21, 2020

(54) ELECTRONIC APPARATUS AND METHOD TO UPDATE FIRMWARE OF THE ELECTRONIC APPARATUS WHEN ADDING A WEB APPLICATION TO THE ELECTRONIC APPARATUS

(71) Applicant: Xiaofeng Han, Kanagawa (JP)

(72) Inventor: Xiaofeng Han, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/153,867

(22) Filed: Oct. 8, 2018

(65) Prior Publication Data

US 2019/0199882 A1   Jun. 27, 2019

(30) Foreign Application Priority Data

Dec. 21, 2017 (JP) ................................. 2017-245084
Aug. 7, 2018 (JP) ................................. 2018-148899

(51) Int. Cl.
*H04N 1/00* (2006.01)
*G06F 3/12* (2006.01)
*G06F 8/65* (2018.01)

(52) U.S. Cl.
CPC ......... *H04N 1/00938* (2013.01); *G06F 3/123* (2013.01); *G06F 3/1204* (2013.01);
(Continued)

(58) Field of Classification Search
None
See application file for complete search history.

(56) References Cited

U.S. PATENT DOCUMENTS 9,762,766 B2   9/2017 Han
2011/0022377 A1   1/2011 Han et al.
(Continued)

FOREIGN PATENT DOCUMENTS

CN   106155679 A   11/2016
CN   106941578 A   7/2017
(Continued)

OTHER PUBLICATIONS

Extended European Search Report dated Apr. 24, 2019 in Patent Application No. 18199388.2, 8 pages.
(Continued)

*Primary Examiner* — Thomas D Lee
(74) *Attorney, Agent, or Firm* — Oblon, McClelland, Maier & Neustadt, L.L.P.

(57) ABSTRACT

An electronic apparatus communicably connected to a server includes circuitry to display, on a display, an application list based on web content acquired from the server. The application list is a list of a plurality of applications available with the electronic apparatus. The plurality of applications includes at least a web application. The circuitry acquires first version information from the server. The first version information indicates a version of firmware required for the electronic apparatus to use the web application included in the application list displayed. The circuitry determines whether second version information is equal to or newer than the first version information acquired from the server. The second version information indicates a current version of firmware installed on the electronic apparatus. The circuitry updates the firmware of the electronic apparatus in response to a determination indicating that the second version information is older than the first version information.

12 Claims, 13 Drawing Sheets

(52) U.S. Cl.
CPC ........... *G06F 8/65* (2013.01); *H04N 1/00244* (2013.01); *H04N 1/00427* (2013.01); *H04N 2201/0094* (2013.01)

(56) References Cited

U.S. PATENT DOCUMENTS

| | | |
|---|---|---|
| 2012/0062948 A1 | 3/2012 | Nishikawa |
| 2013/0139142 A1 | 5/2013 | Ikawa et al. |
| 2013/0145141 A1 | 6/2013 | Han et al. |
| 2013/0174141 A1 | 7/2013 | Hirokawa et al. |
| 2013/0174270 A1 | 7/2013 | Sugiura et al. |
| 2013/0219261 A1 | 8/2013 | Han et al. |
| 2014/0281914 A1 | 9/2014 | Sakawaki et al. |
| 2014/0380502 A1 | 12/2014 | Sugiura et al. |
| 2015/0057990 A1 | 2/2015 | Han et al. |
| 2015/0220323 A1 | 8/2015 | Ikawa et al. |
| 2015/0309996 A1 | 10/2015 | Han |
| 2016/0337536 A1 | 11/2016 | Han |
| 2016/0337544 A1* | 11/2016 | Han .................. H04N 1/00938 |
| 2017/0078293 A1 | 3/2017 | Han |
| 2017/0102934 A1* | 4/2017 | Xu ........................... G06F 8/65 |
| 2017/0255763 A1 | 9/2017 | Han |
| 2017/0272597 A1 | 9/2017 | Han |

FOREIGN PATENT DOCUMENTS

| | | |
|---|---|---|
| CN | 107193575 A | 9/2017 |
| JP | 2016-212855 | 12/2016 |

OTHER PUBLICATIONS

Office Action dated Jan. 22, 2020 in Chinese Application No. 201811571867.7, 10 pages.

* cited by examiner

FIG. 7

Registration of Application

| | | |
|---|---|---|
| Application Name | : | ID Card Copy (G110) |
| Application Type | : | ○ Native  ◉ Web (G120) |
| Product ID | : | P101 (G130) |
| Product Key | : | (G140) |
| Shortcut Destination URL | : | http:// ··· (G150) |
| Icon Image | : | ID Card Copy (G160) [Icon Delete] (161) |
| Support Model | : | ☑ model100  ☑ model101  ☐ model102 (G170) |
| Required Firmware Version | : | FWVer2.50 ▽ (G180) |

[Cancel] [OK] (G190)

| PRODUCT ID | APPLICATION NAME | APPLICA-TION TYPE | PRODUCT KEY | SHORTCUT DESTINATION URL | ICON IMAGE | SUPPORT MODEL | REQUIRED FIRMWARE VERSION | ... |
|---|---|---|---|---|---|---|---|---|
| P101 | XX COPY | Web | — | http://··· | ... | model100 | FWVer2.40 | ... |
| P102 | YY PRINT | Native | K12345 | — | — | model100 | FWVer2.40 | ... |
| P103 | ID CARD COPY | Web | — | http://··· | ... | model100, model101 | FWVer2.50 | ... |
| ... | ... | ... | ... | ... | ... | ... | ... | ... |

630

APPLICATION INFORMATION: {REQUIRED FIRMWARE VERSION, ...}

ELECTRONIC APPARATUS AND METHOD TO UPDATE FIRMWARE OF THE ELECTRONIC APPARATUS WHEN ADDING A WEB APPLICATION TO THE ELECTRONIC APPARATUS

CROSS-REFERENCE TO RELATED APPLICATIONS

This patent application is based on and claims priority pursuant to 35 U.S.C. § 119(a) to Japanese Patent Application Nos. 2017-245084, filed on Dec. 21, 2017, and 2018-148899, filed on Aug. 7, 2018, in the Japan Patent Office, the entire disclosures of which are hereby incorporated by reference herein.

BACKGROUND

Technical Field

Embodiments of the present disclosure relate to an electronic apparatus, an information processing system, and a method of processing information.

Related Art

A mechanism of downloading an application from a web page provided by a web server and installing the application on an electronic apparatus, such as a multifunction peripheral (MFP), has been known. Applications that can be downloaded and installed from a web page are distributed in a format such as an object file format and installed on the MFP by an installer, for example. Such an application distributed in the object file format (in other words, an application installed on an MFP by an installer) is also referred to as a "native application".

There is also a known technique of determining, when a native application is downloaded and installed on an MFP from a web site, whether firmware is required to be updated or not based on an object file and of updating the firmware of the MFP according to a determination result.

Some web pages introduce various applications including not only a native application but also a web application. Such a web application does not have an object file to be used for determining whether firmware is required to be updated or not.

SUMMARY

An exemplary embodiment of the present disclosure includes an electronic apparatus communicably connected to a server. The electronic apparatus includes circuitry to display, on a display, an application list based on web content acquired from the server. The application list is a list of a plurality of applications available with the electronic apparatus. The plurality of applications includes at least a web application. The circuitry acquires first version information from the server. The first version information indicates a version of firmware required for the electronic apparatus to use the web application included in the application list displayed. The circuitry determines whether second version information is equal to or newer than the first version information acquired from the server. The second version information indicates a current version of firmware installed on the electronic apparatus. The circuitry updates the firmware of the electronic apparatus in response to a determination indicating that the second version information is older than the first version information.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 7 is an illustration of an example of an application registration screen, according to one of the embodiments of the disclosure;

FIG. 8 is a conceptual diagram illustrating an example of application information, according to one of the embodiments of the disclosure;

Figure 1:
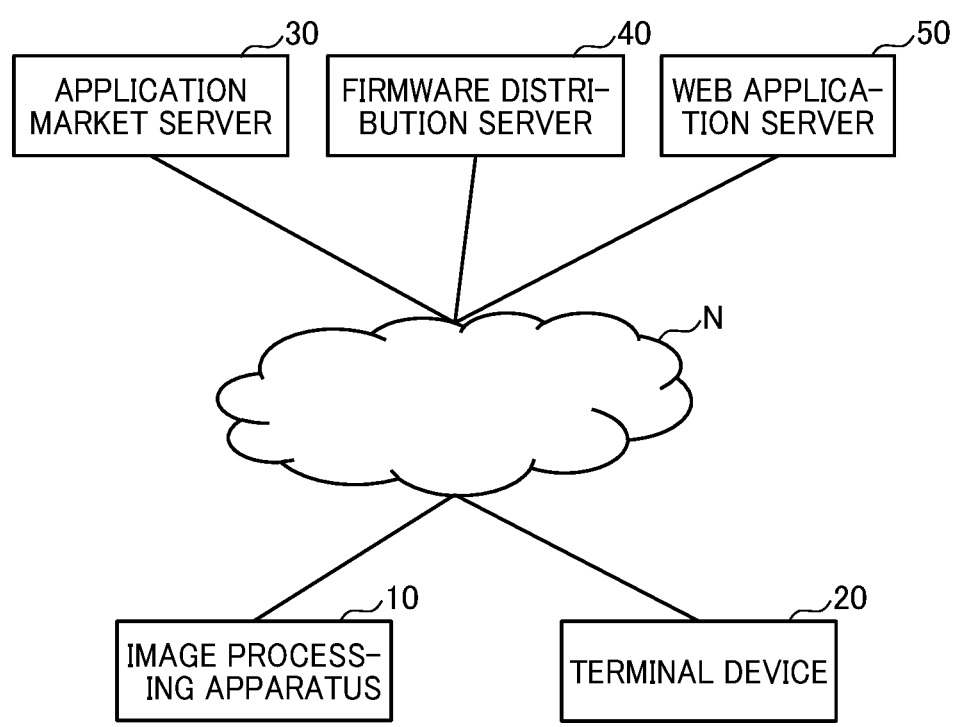
FIG. 1 is a schematic view illustrating an example configuration of an image processing system according to one of the embodiments of the disclosure.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

Hereinafter, a description is given of some embodiments of the disclosure with reference to the attached drawings.

Overview of System Configuration

A description is given of an overview of a configuration of an image processing system 1 according to one of the embodiments of the disclosure, with reference to FIG. 1.

FIG. 1 is a schematic view illustrating an example configuration of the image processing system 1 according to the embodiment.

As illustrated in FIG. 1, the image processing system 1 according to the embodiment includes, for example, one or more electronic apparatuses (for example, an image processing apparatus 10), one or more terminal devices 20, an application market server 30, a firmware distribution server 40, and a web application server 50. The image processing apparatus 10, the terminal device 20, the application market server 30, the firmware distribution server 40, and the web application server 50 are communicably connected to each other via a network N such as the Internet.

The application market server 30 is a web server that provides a web site (hereinafter, also referred to as an "application market site"). The web site, namely the application market site, introduces an application usable in the image processing apparatus 10, which is an example of the electronic apparatus. The application market server 30 is implemented with one or more information processing apparatuses (computers).

Types of applications introduced on the application market site include, for example, a native application and a web application. The native application is an application that is distributed in, for example, an object file format and installed on the image processing apparatus 10 by an installer or the like. The web application is an application that is distributed in a uniform resource locator (URL) format to use the web application (i.e. a URL format of the web application server 50 that provides the web application), for example. In addition, the web application becomes available by registering, with the image processing apparatus 10, a shortcut icon or the like indicating the URL. However, the types of the applications introduced on the application market site are not limited to the native application and the web application, and various kinds of applications may be introduced. A URL is an example of address information. An icon is an example of a display component.

In addition, applications introduced on the application market site are registered with the application market server 30 by the terminal device 20, in advance.

An example of the electronic apparatus is the image processing apparatus 10 that includes a multifunctional peripheral (MFP), which has a print function, a copy function, a scan function, a facsimile communication function, and the like. In addition, other examples of the electronic apparatus further include an office device, such as a printer, a scanner, an electronic whiteboard, a projector, and a teleconference terminal and a shared terminal used in an office. The examples of the electronic apparatus further include an imaging device such as a digital camera, a game device, an in-vehicle terminal, an output device such as a digital signage, a head up display (HUD) device, an industrial machine, a mobile phone, a smartphone, a tablet terminal, a personal digital assistant (PDA), a wearable personal computer (PC), and a desktop PC.

The image processing apparatus 10 can use an application (a native application or a web application) by installing, or adding, the application on, or to, the image processing apparatus 10 from the application market site provided by the application market server 30.

In the description of the embodiment, installing, or adding, a native application on, or to, the image processing apparatus 10 means installing an object file on the image processing apparatus 10. In addition, installing, or adding, a web application on, or to, the image processing apparatus 10 means registering, with the image processing apparatus 10, a shortcut icon indicating a URL of the web application server 50 that provides the web application. In the following description of the embodiment, a case in which the image processing apparatus 10 installs, or adds, a web application from the application market site is mainly focused.

When installing, or adding, the web application from the application market site, the image processing apparatus 10 determines whether a current version of the firmware of the image processing apparatus 10 is a version that is required for using the web application or not. If the current version of the firmware of the image processing apparatus 10 is not satisfied with a required version, which is required for using the web application, the image processing apparatus 10 acquires another version of the firmware, which is required for using the web application, from the firmware distribution server 40 and updates the firmware. The firmware is software (program) for controlling the operation of the image processing apparatus 10.

The firmware distribution server 40 is a server that provides firmware in response to a request from the image processing apparatus 10. The firmware distribution server 40 is implemented with one or more information processing apparatuses (computers).

The terminal device 20 includes, for example, a PC, a smartphone, and a tablet terminal and registers, with the application market server 30, an application to be introduced on the application market site. The terminal device 20 is used by a vendor (third vendor) that develops applications, for example.

The web application server 50 is a web application server that provides a web application to be installed on, or added to, the image processing apparatus 10. The web application installed on, or added to, (registered with) the image processing apparatus 10 is implemented by executing web content (for example, hypertext markup language (HTML), JavaScript (registered trademark) etc.) provided by the web application server 50 on a browser of the image processing apparatus 10.

The web application server 50 is set by a third vendor who develops applications, for example. Alternatively, the web application server 50 may be set by a company that sets the application market server 30, for example.

The image processing system 1 illustrated in FIG. 1 is merely one example, and any other suitable configuration may be used. For example, the image processing system 1 illustrated in FIG. 1 may include an application distribution server that provides an object file of a native application, which is introduced on an application market site, to the image processing apparatus 10.

Hardware Configuration

A description is now given of a hardware configuration of the image processing apparatus 10, the terminal device 20, the application market server 30, and the firmware distribution server 40, which are included in the image processing system 1, according to the embodiment.

Image Processing Apparatus 10

Figure 2:
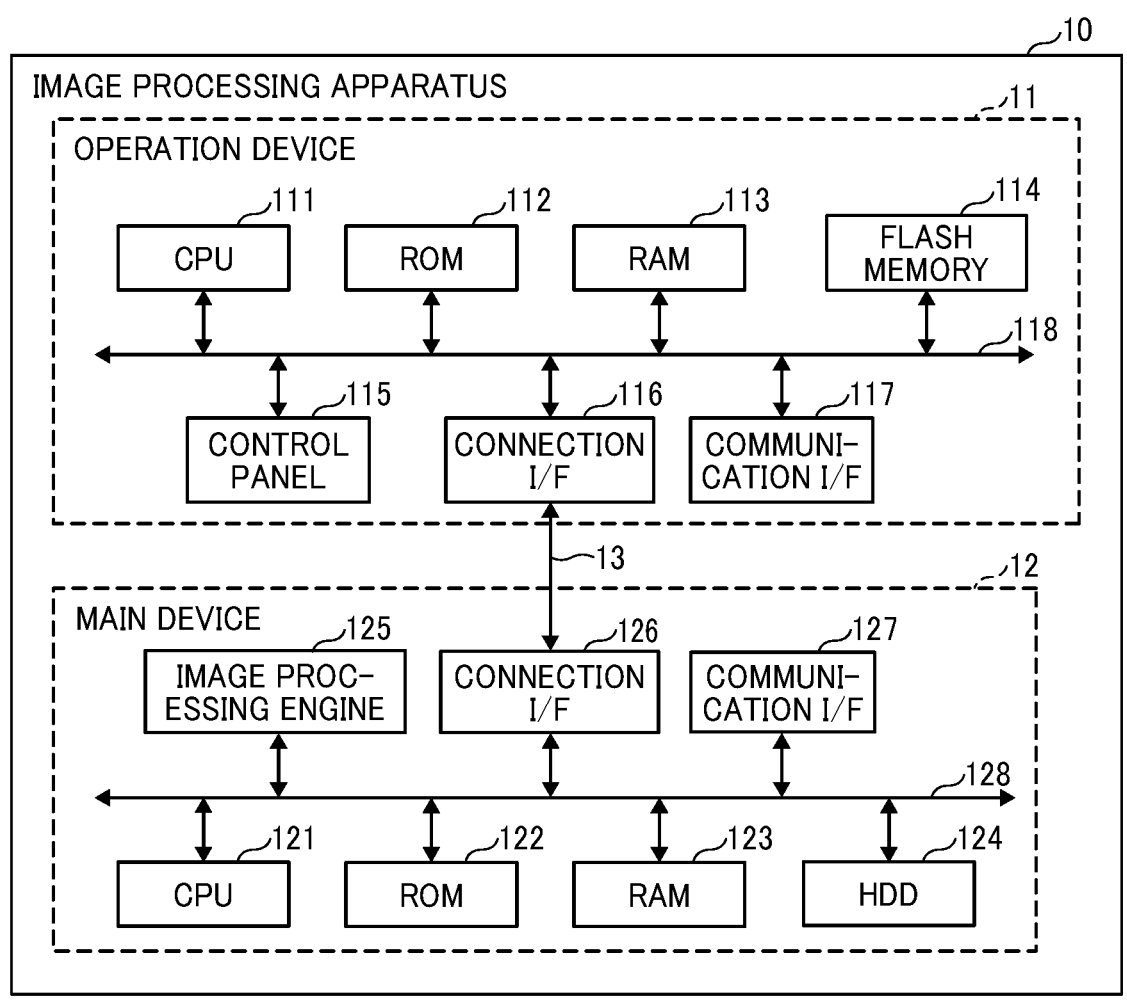
FIG. 2 is a block diagram illustrating an example of a hardware configuration of an image processing apparatus according to one of the embodiments of the disclosure.

A description is now given of the hardware configuration of the image processing apparatus 10 according to the embodiment, with reference to FIG. 2.

FIG. 2 is a block diagram illustrating an example of the hardware configuration of the image processing apparatus 10 according to the embodiment.

As illustrated in FIG. 2, the image processing apparatus 10 according to the embodiment includes, for example, an operation device 11 and a main device 12.

The operation device 11 is operated by a user for performing various user operations. For example, the operation device 11 is operated to select an image processing function to be performed by the main device 12. In addition, the operation device 11 is operated to input various types of setting values for performing an image processing function or instructions for starting execution of an image processing function, for example. In addition, the operation device 11 is operated to switch a display screen, for example.

The main device 12 performs various types of processing such as an image processing function according to a user operation performed with the operation device 11.

As illustrated in FIG. 2, the operation device 11 of the image processing apparatus 10 includes, for example, a central processing unit (CPU) 111, a read only memory (ROM) 112, and a random access memory (RAM) 113. In addition, the operation device 11 includes, for example, a flash memory 114, a control panel 115, a connection interface (I/F) 116, and a communication I/F 117. The above-mentioned hardware resources are connected to each other through a bus 118.

The CPU 111 executes various types of programs stored in the ROM 112 or the flash memory 114 using the RAM 113 as a work area to control overall operation of the operation device 11.

The ROM 112 is a nonvolatile semiconductor memory (storage device) capable of storing programs and data even after the power is turned off. The RAM 113 is a volatile semiconductor memory (storage device) that temporarily stores programs and data.

The flash memory 114 is a nonvolatile storage device that stores various types of programs, such as a program for implementing the embodiment, executed by the CPU 111 and various types of data.

The control panel 115 is used by the user to perform various types of operation. The control panel 115 also displays various screens to the user.

The connection I/F 116 is an interface for communicating with the main device 12 through a communication path 13. As one example of the connection I/F 116, a universal serial bus (USB) standard interface is used.

The communication I/F 117 is an interface for communicating with other apparatuses. As one example of the communication I/F 117, a wireless local area network (LAN) using a wireless fidelity (Wi-Fi) standard is used.

The main device 12 of the image processing apparatus 10 includes, for example, a CPU 121, a ROM 122, and a RAM 123. In addition, the main device 12 includes, for example, a hard disk drive (HDD) 124, an image processing engine 125, a connection I/F 126, and a communication I/F 127. The above-mentioned hardware resources are connected to each other through a bus 128.

The CPU 121 executes a program stored in the ROM 122 or the HDD 124 using the RAM 123 as a work area to control overall operation of the main device 12.

The ROM 122 is a nonvolatile semiconductor memory (storage device) capable of storing programs and data even after the power is turned off. The RAM 123 is a volatile semiconductor memory (storage device) that temporarily stores programs and data.

The HDD 124 is a nonvolatile storage device and stores various types of programs, including the program for implementing the embodiment, executed by the CPU 121 and various types of data.

The image processing engine 125 is hardware that performs image processing for the various types of image processing function including a print function, a scanner function, a copy function, and a facsimile communication function, and the print function.

The image processing engine 125 includes, for example, a plotter that prints an image on sheet member, a scanner that scans and optically reads an image of a document and generate image data, and a facsimile communication device that carries out facsimile communication. In some embodiments, the image processing engine 125 may also include a finisher that sorts printed sheets and/or an automatic document feeding device (ADF) that automatically feeds a document.

The connection I/F 126 is an interface to communicate with the operation device 11 through the communication path 13. As one example of the connection I/F 126, a universal serial bus (USB) standard interface is used.

The communication I/F 127 is an interface for communicating with other apparatuses. As one example of the communication I/F 127, a wireless LAN using a Wi-Fi standard is used.

With the hardware configuration illustrated in FIG. 2, the image processing apparatus 10 according to the embodiment implements the various types of processing as described later.

In FIG. 2, the image processing apparatus 10 includes the operation device 11, but the embodiments of the disclosure are not limited to this. For example, in some embodiments, an information processing terminal such as a tablet terminal, a smartphone, a portable mobile phone, or a personal digital assistant (PDA) may serve as a control device (operation device) of the image processing apparatus 10. That is, such an information processing terminal may control the image processing apparatus 10 by communicating with the image processing apparatus 10 via the communication I/F 117 of the operation device 11 or the communication I/F 127 of the main device 12.

Terminal Device 20, Application Market Server, 30 and Firmware Distribution Server 40

Figure 3:
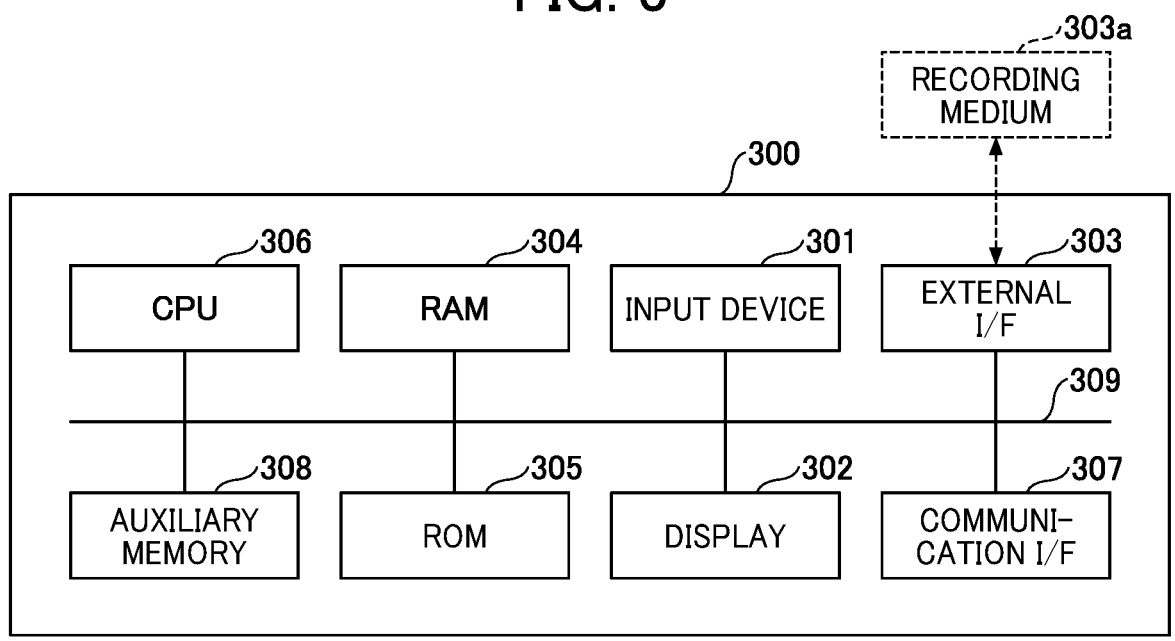
FIG. 3 is a block diagram illustrating an example of a hardware configuration of a computer according to one of the embodiments of the disclosure.

FIG. 3 is a diagram illustrating an example of a hardware configuration of a computer 300 according to the present embodiment. The terminal device 20 according to the embodiment is implemented with the computer 300 illustrated in FIG. 3, for example. As with the terminal device 20, one or more information processing apparatuses that implements each of the application market server 30 and the firmware distribution server 40 are implemented with the computer 300 illustrated in FIG. 3, for example.

The computer 300 illustrated in FIG. 3 includes, for example, an input device 301, a display 302, an external I/F 303, a RAM 304, a ROM 305, a CPU 306, a communication I/F 307, and an auxiliary memory 308. The above-mentioned hardware resources are connected to each other through a bus 309.

The input device 301 includes, for example, a keyboard, a mouse, and a touch panel and is used to input various operation signals by the user. The display 302 displays results of processing performed by the computer 300. The computer 300 may include at least one of the input device 301 and the display 302.

The communication I/F 307 is an interface that connects the computer 300 to the network N. The computer 300 can establish communication via the communication I/F 307 for transmitting and receiving data.

The external I/F 303 is an interface that connects the computer 300 to an external device. As an example of the external device, a recording medium 303a is used here. The external I/F 303 enables the computer 300 to read or write data from or to the recording medium 303a. Examples of the recording medium 303a include a flexible disc, a compact disc (CD), a digital versatile disc (DVD), a secure digital (SD) memory card, and a universal serial bus (USB) memory.

The ROM 305 is a nonvolatile semiconductor memory (storage device) capable of storing programs and data so as to retain the stored programs and data even after the power is turned off as the power is not supplied. The ROM 305 stores programs or data such as a basic input output system (BIOS), which is launched when the computer 300 is started up, operating system (OS) settings, and network settings. The RAM 304 is a volatile semiconductor memory (storage device) that temporarily stores programs and data.

The CPU 306 reads programs and data from a storage device such as the ROM 305 or the auxiliary memory 308 onto the RAM 304, and executes processing for controlling the computer 300 or implementing a function of the computer 300.

The auxiliary memory 308 is a nonvolatile storage device that stores programs and data. Examples of the auxiliary memory 308 includes an HDD and a solid state drive (SSD). Examples of the programs or data stored in the auxiliary memory 308 include an OS for controlling the overall operation of the computer 300 and application software providing various functions on the OS. The programs and data stored in the auxiliary memory 308 may be managed using a file system or database.

In addition, the hardware configuration of the computer 300 illustrated in FIG. 3 allows the terminal device 20 according to the embodiment to implement various kinds of processes as described later. As with the terminal device 20, the hardware configuration of the computer 300 illustrated in FIG. 3 allows the application market server 30 and the firmware distribution server 40 according to the embodiment to implement various kinds of processes as described later.

In addition, one or more information processing apparatuses that implement the web application server 50 may be implemented with the computer 300 as illustrated in FIG. 3.

Layer Structure of Software Groups of Image Processing Apparatus 10

Figure 4:
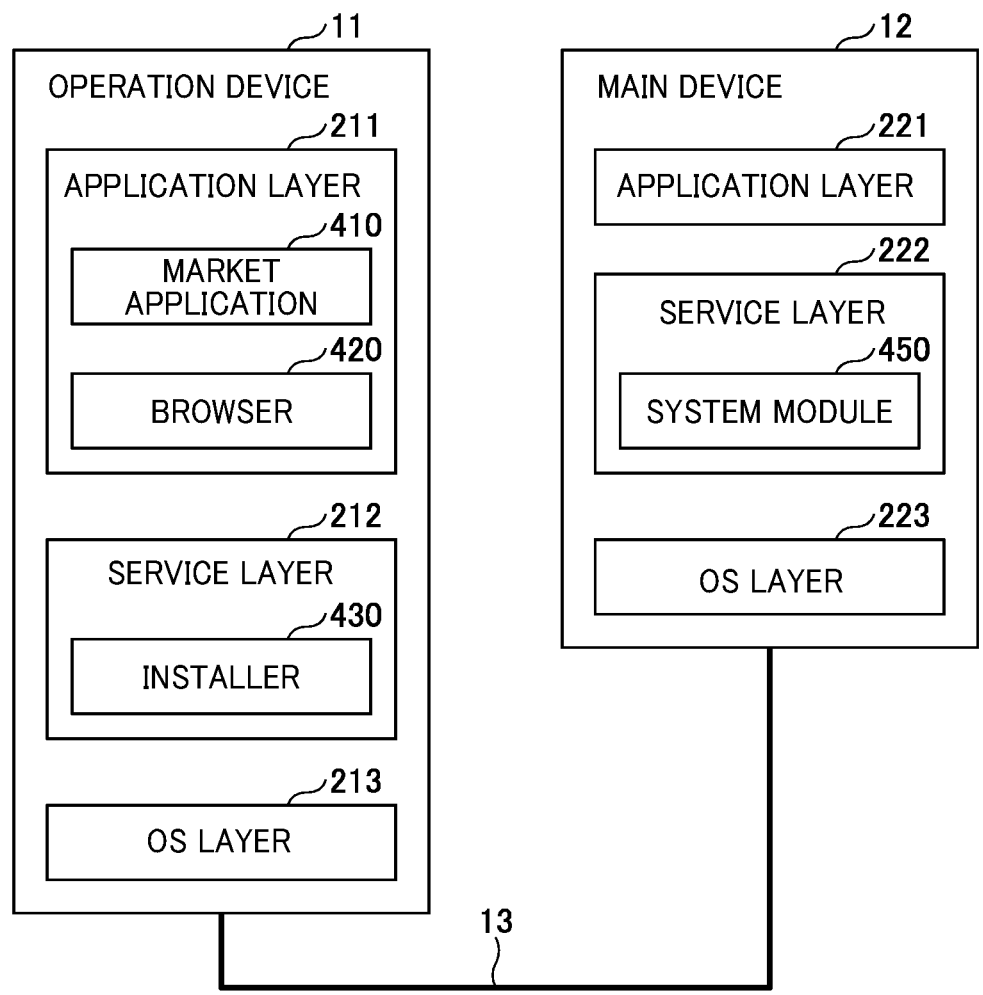
FIG. 4 is a block diagram illustrating an example of a layer structure of software groups included in an operation device and a main device of an image processing apparatus according to one of the embodiments of the disclosure.

A description is now given of a layer structure of software groups included in the operation device 11 and the main device 12 of the image processing apparatus 10 according to the embodiment, with reference to FIG. 4.

FIG. 4 is a block diagram illustrating an example of the layer structure of software groups included in the operation device 11 and the main device 12 of the image processing apparatus 10 according to the embodiment.

In FIG. 4, a layer structure of software groups included in the operation device 11 and another layer structure of software groups included in the main device 12 are illustrated.

The layer structure of software groups included in the main device 12, (which is, namely, a program group stored in the ROM 122 or the HDD 124 of the main device 12) is described below. The software groups included in the main device 12 are classified into an application layer 221, a service layer 222, and an operating system (OS) layer 223.

Software classified in the application layer 221 is executed to operate one or more hardware resources to implement each image processing function. More specifically, the software classified in the application layer 221 includes, for example, a print application, a scan application, a copy application, and a facsimile application.

Software classified in the service layer 222 arbitrates between the application layer 221 and the OS layer 223. The software classified in the service layer 222 functions as an interface that enables the software of the application layer 221 to use the hardware resources included in the main device 12 and informs a state of the hardware resources included in the main device 12.

More specifically, the software of the service layer 222 receives an execution request for each hardware resource and arbitrates the received execution request. The execution request received by the service layer 222 includes, for example, an execution request to perform image processing using the image processing engine 125 (e.g., a scan execution request to scan using a scanner, a print execution request to print out using a plotter).

The same interface function described above of the software of the service layer 222 also applies in relation to the software of the application layer 211 of the operation device 11. That is, the software classified in the application layer 211 of the operation device 11 also implements image processing function by accessing the service layer 222 to cause corresponding one or more hardware resources of the main device 12 to operate to implement the image processing function.

An example of the software classified in the service layer 222 includes a system module 450. The system module 450 is software (a program) for managing a version of the firmware of the image processing apparatus 10 and updating the firmware.

The software classified in the OS layer 223 is a program called as basic software (OS) that provides basic functions for controlling each hardware resource of the main device 12. The software classified in the OS layer 223 receives an exaction request for each hardware resource from the software classified in the application layer 221 via the software classified in the service layer 222 and perform processing corresponding to the execution request.

The layer structure of software groups included in the operation device 11, namely a program groups stored in the ROM 112 and the flash memory 114 of the operation device 11, is described below. As in the main device 12, the software groups included in the operation device 11 are classified into the application layer 211, a service layer 212, and an OS layer 213.

However, a function provided by executing software classified in the application layer 211 and types of execution requests acceptable with the service layer 212 are different from those of the main device 12. The software classified in the application layer 211 of the operation device 11 mainly provides a user interface function for performing various types of operation and displaying.

Examples of the software classified in the application layer 211 include a market application 410 and a browser 420. The market application 410 is software (program) for displaying the application market site on the browser 420. The browser 420 is software (program) for displaying a website such as an application market site. In addition, the browser 420 can provide a service implemented by a web application by executing web content acquired from the web application server 50.

An example of the software classified in the service layer 212 includes an installer 430. The installer 430 is software (program) for installing a native application on the image processing apparatus 10 and for displaying a screen (firmware update confirmation screen) for notifying the user of requirement to update the firmware.

In the embodiment, the OSes of the operation device 11 and the main device 12 operate individually and independently. In addition, the OS of the operation device 11 may be different from the OS of the main device 12 as long as the operation device 11 and the main device 12 can communicate with each other. For example, the operation device 11 may use Android (registered trademark) as an OS while the main device 12 may use Linux (registered trademark) as an OS.

As described above, in the image processing apparatus 10 according to the embodiment, the operation device 11 is controlled by the OS that is different from the OS of the main device 12. Accordingly, a communication established between the operation device 11 and the main device 12 is not regarded as an inter-process communication in a shared apparatus, but as a communication between two different information processing apparatuses.

However, the image processing apparatus 10 according to the embodiment is not limited to the above-described case where the OS of the operation device 11 and the OS of the main device 12 are different from each other, but the same type of the OS may operate in each of the operation device 11 and the main device 12. In addition, the image processing apparatus 10 according to the embodiment is not limited to the above-described case where the OS of the operation device 11 and the OS of the main device 12 operate individually and independently, but a single OS may operate on the operation device 11 and the main device 12.

In addition, each of the operation device 11 and the main device 12 has firmware. Hereafter, the firmware of the operation device 11 is referred to as "first firmware", and the firmware of the main device 12 is referred to as "second firmware". When the first firmware and the second firmware are not necessarily distinguished from each other, the first firmware and the second firmware are collectively or individually referred to as simply "firmware".

The first firmware is software (program) classified in the service layer 212 and the second firmware is software (program) classified in the service layer 222. However, the first firmware may include software (program) classified in the OS layer 213, and the second firmware may include software (program) classified in the OS layer 223.

Functional Configuration

Figure 5:
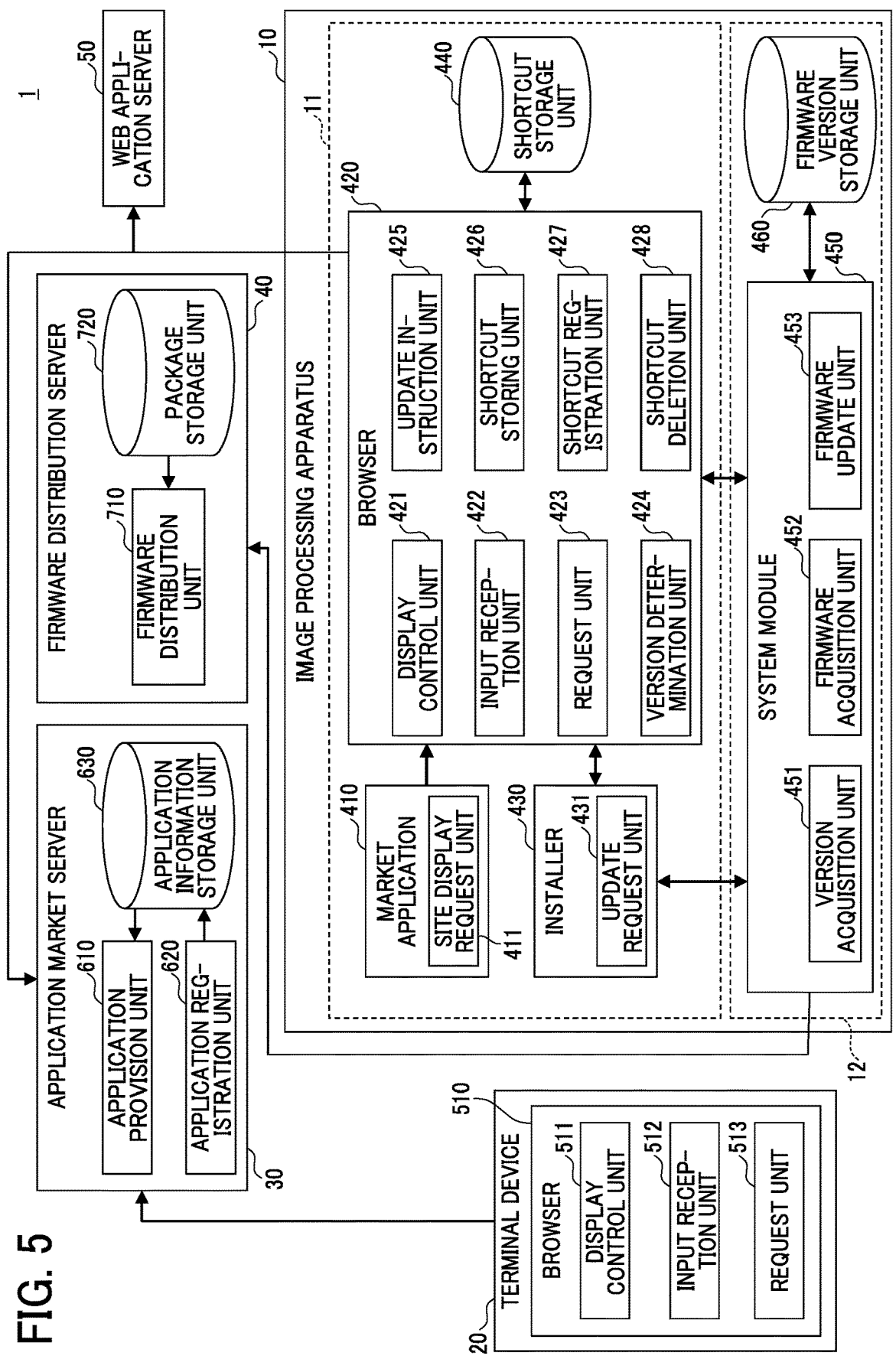
FIG. 5 is a block diagram illustrating an example of a functional configuration of an information processing system according to one of the embodiments of the disclosure.

A description is now given of a functional configuration of the image processing system 1 according to the embodiment, with reference to FIG. 5.

FIG. 5 is a block diagram illustrating an example of a functional configuration of the image processing system 1 according to the embodiment.

As illustrated in FIG. 5, the operation device 11 of the image processing apparatus 10 according to the embodiment includes, for example, a market application 410, the browser 420, the installer 430, and a shortcut storage unit 440.

In addition, as illustrated in FIG. 5, the main device 12 of the image processing apparatus 10 according to the embodiment includes, for example, the system module 450 and a firmware version storage unit 460.

The market application 410 executed by the CPU 111 implements, for example, a site display request unit 411. The site display request unit 411 causes the browser 420 to display the application market site.

The browser 420, when executed by the CPU 111, implements, for example, a display control unit 421, an input reception unit 422, a request unit 423, a version determination unit 424, an update instruction unit 425, a shortcut storing unit 426, a shortcut registration unit 427, and the shortcut deletion unit 428.

The display control unit 421 displays screens of various web sites including the application market site. The input reception unit 422 receives various user operations according to user inputs performed on the web site.

The request unit 423 transmits various requests. The various requests include, for example, a display request to acquire a screen (web page) of the application market site from the application market server 30, an acquisition request to acquire a version of the firmware of the image processing apparatus 10 from the main device 12. In addition, the various requests include, for example, an acquisition request to acquire, from the application market server 30, application information to be installed on, or added to, the image processing apparatus 10.

The version determination unit 424 determines whether a current version of the firmware of the image processing apparatus 10 is equal to or newer than a required version for using the web application to be installed on, or added to, the image processing apparatus 10 or not. In the description of the embodiment, a version of the firmware being equal to or newer than a required version for using an application means that the version of the firmware satisfied with requirements for using the web application to be installed on, or added to, the image processing apparatus 10.

When the current version of the firmware of the image processing apparatus 10 is not equal to or newer than the required version for using the web application to be installed on, or added to, the image processing apparatus 10, the update instruction unit 425 instructs the installer 430 to update the firmware.

When the current version of the firmware of the image processing apparatus 10 is not equal to or newer than the required version for using the web application to be installed on, or added, to the image processing apparatus 10, the shortcut storing unit 426 stores shortcut information associated with the web application (for example, a shortcut icon image, a URL of a shortcut destination, etc.) in the shortcut storage unit 440. The shortcut storage unit 440 may be implemented by using, for example, the flash memory 114.

When the update of the firmware succeeds, the shortcut registration unit 427 registers a shortcut icon with the operation device 11 using the shortcut information stored in the shortcut storage unit 440. By registering the shortcut icon with the operation device 11, the web application provided by the web application server 50 of the shortcut destination URL indicated by the shortcut icon becomes available (that is, installing, or adding, the web application on, or to, the image processing apparatus 10 is completed).

When the update of the firmware fails, the shortcut deletion unit 428 deletes the shortcut information, which is stored in the shortcut storage unit 440.

The installer 430 executed by the CPU 111 implements, for example, an update request unit 431. When the update of the firmware is instructed by the browser 420, the update request unit 431 requests the system module 450 of the main device 12 to update the firmware. In addition, the installer 430 executed by the CPU 111 may implement an install unit for installing a native application on the operation device 11, for example.

The system module 450 executed by the CPU 121 implements, for example, a version acquisition unit 451, a firmware acquisition unit 452, and a firmware update unit 453.

The version acquisition unit 451 acquires information indicating the current version of the firmware of the image processing apparatus 10 from the firmware version storage unit 460. The firmware version storage unit 460 stores information indicating the current version of the firmware of the image processing apparatus 10 (for example, a version number, etc.). In addition, the firmware version storage unit 460 may be implemented by using, for example, the HDD 124.

When the update of the firmware is requested from the operation device 11, the firmware acquisition unit 452 acquires the latest version of the firmware from the firmware distribution server 40. The firmware is provided as a package of the latest version of the first firmware and the latest version of the second firmware. Hereinafter, the package of the latest version of the first firmware and the latest version of the second firmware is also referred to as a firmware package.

The firmware update unit 453 updates the firmware of the image processing apparatus 10 with the firmware (the latest version of the firmware) acquired from the firmware distribution server 40.

As illustrated in FIG. 5, the terminal device 20 according to the embodiment includes, for example, a browser 510. The browser 510 executed by the CPU 306 implements, for example, a display control unit 511, an input reception unit 512 and a request unit 513.

The display control unit 511 displays, for example, a web site screen (web page) for registering an application to be introduced on the application market site. The input reception unit 512 receives various user operations according to user inputs performed on the web site.

The request unit 513 transmits various requests. Various requests include, for example, a display request to acquire, from the application market server 30, a screen (web page) of the web site for registering an application to be introduced on the application market site. In addition, various requests include a registration request to register, with the application market server 30, an application to be introduced on the application market site.

As illustrated in FIG. 5, the application market server 30 according to the embodiment includes, for example, an application provision unit 610 and an application registration unit 620. Each of the application provision unit 610 and the application registration unit 620 are implemented by the CPU 306 executing one or more programs installed onto the application market server 30.

In addition, the application market server 30 according to the embodiment includes, for example, an application information storage unit 630. The application information storage unit 630 may be implemented by using, for example, an auxiliary storage device such as an HDD. In addition, the application information storage unit 630 may be implemented by using a storage device connected to the application market server 30 via a network (for example, a database (DB) server, etc.).

The application provision unit 610 provides a screen of the application market site to the image processing apparatus 10. In addition, the application provision unit 610 acquires, from the application information storage unit 630, application information on an application that is selected on the application market site (that is, an application to be installed on, or added to, the image processing apparatus 10) and provides the acquired application information to image processing apparatus 10.

The application registration unit 620 provides, to the terminal device 20, a registration screen (application registration screen) for registering an application to be introduced on the application market site. In addition, the application registration unit 620 saves, in the application information storage unit 630, various information on an application that is registered via the application registration screen as application information.

The application information storage unit 630 stores the application information on an application, which is introduced on the application market site. The application information includes, for example, a name of the application (application name) and a required version of firmware for using the application. A detailed description of the application information is described later.

As illustrated in FIG. 5, the firmware distribution server 40 according to the embodiment includes, for example, a firmware distribution unit 710. The firmware distribution unit 710 is implemented by the CPU 306 executing one or more programs installed onto the firmware distribution server 40.

In addition, the firmware distribution server 40 according to the embodiment includes, for example, a package storage unit 720. The package storage unit 720 may be implemented by using an auxiliary storage device such as an HDD. In addition, the package storage unit 720 may be implemented by using a storage device (for example, a DB server) connected to the firmware distribution server 40 via a network.

In response to a request from the image processing apparatus 10, the firmware distribution unit 710 acquires the latest version of the firmware package from the package storage unit 720 and distributes the acquired firmware package to the image processing apparatus 10.

The package storage unit 720 stores the latest version of the firmware package. In addition to the latest version of the firmware package, the package storage unit 720 stores other versions of the firmware package, which is, for example, older than the latest version.

Operation

Hereinafter, a detailed description is given of the operation performed by the image processing system 1 according to the embodiment.

Application Registration Process

Figure 6:
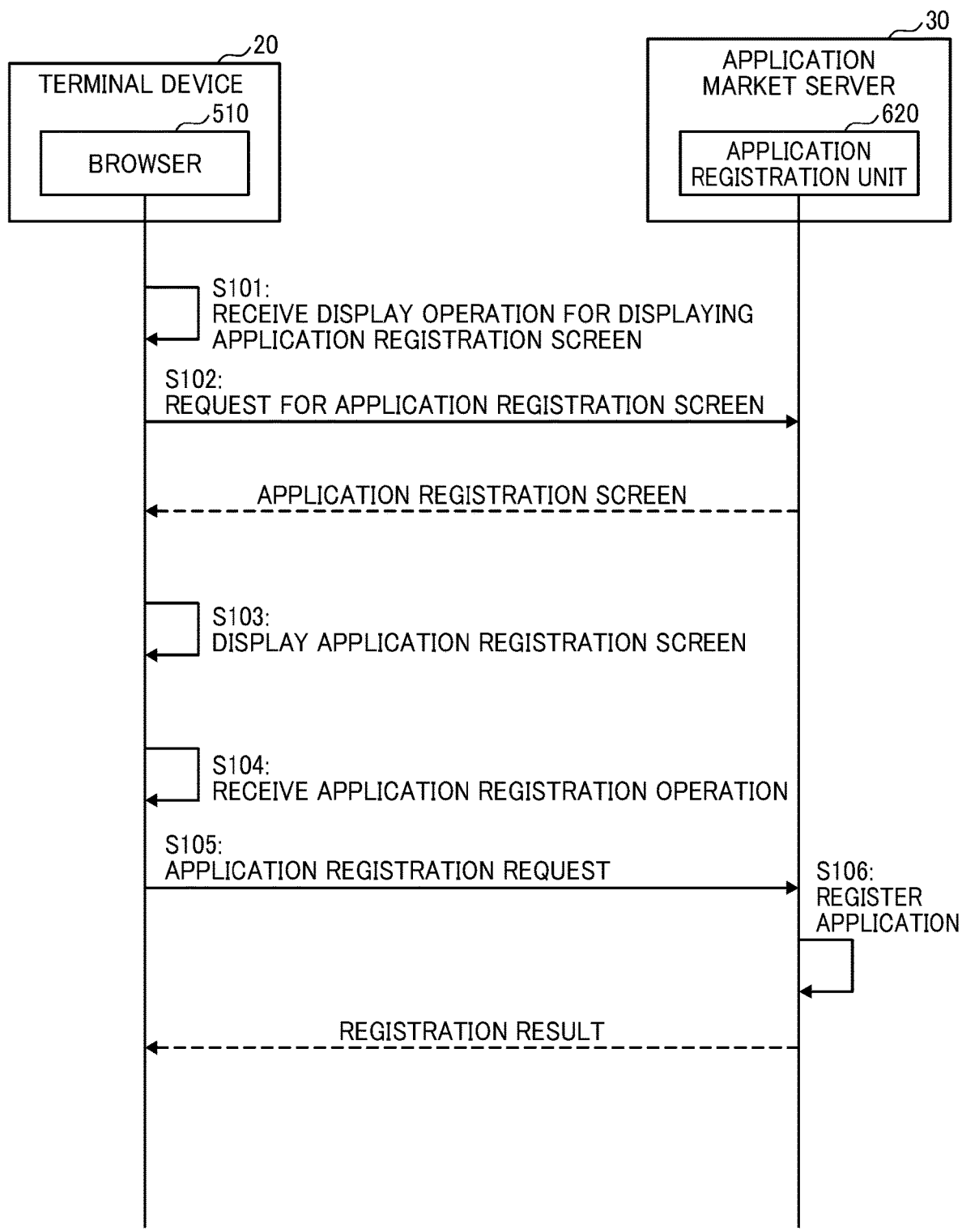
FIG. 6 is a sequence diagram illustrating an example of an application registration process according to one of the embodiments of the disclosure.

A description is now given of a process in which, for example, a person, such as a third vender, uses the terminal device 20 to register a web application with the application market server 30, with reference to FIG. 6. Hereinafter, this process may be referred to as an application registration process.

FIG. 6 is a sequence diagram illustrating an example of the application registration process, according to the embodiment. When a web application is registered with the application market server 30, the web application is introduced on the application market site and can be installed on, or added to, the image processing apparatus 10.

The input reception unit 512 of the browser 510 receives a display operation for displaying the application registration screen (Step S101). The user of the terminal device 20 can perform the display operation for displaying the application registration screen by pressing a link or the like for displaying the application registration screen, for example. In the description here, "pressing" is used to be interchangeable with "touching", "tapping", clicking", etc., which indicates any actions to select and perform an operation.

Then, the request unit 513 of the browser 510 transmits a display request for displaying the application registration screen to the application market server 30 (Step S102). The display request for displaying the application registration screen is, for example, a hypertext transfer protocol (HTTP) request in which the URL of the application registration screen is identified.

Then, the application registration unit 620 of the application market server 30 transmits the application registration screen, as web content, to the terminal device 20. The application registration screen is transmitted to the terminal device 20 as an HTTP response, for example.

Then, the display control unit 511 of the browser 510 interprets the application registration screen transmitted from the application market server 30 and displays, for example, an application registration screen G100 as illustrated in FIG. 7 (Step S103).

The application registration screen G100 illustrated in FIG. 7 is a screen for registering an application to be introduced on the application market site. The application registration screen G100 illustrated in FIG. 7 includes an application name setting field G110, an application type setting field G 120, a product identification information (ID) setting field G130, and a product key setting field G140. In addition, the application registration screen G100 illustrated in FIG. 7 includes a shortcut destination URL setting field G150, an icon image setting field G160, a support model setting field G170, and a required firmware version setting field G180.

In the application name setting field G110, a name (application name) of the application to be introduced on the application market site is set. In the application type setting field G120, a type of application to be introduced on the application market site (native application or web application) is set. For example, when "Native" is selected in the application type setting field G120, the type of the application to be registered is "native application", and when "Web" is selected in the application type setting field G120, the type of the application to be registered is "Web application".

In the product ID setting field G130, a product ID for identifying the application to be introduced on the application market site is set. The product key setting field G140 is used when "Native" is selected in the application type setting field G120, and a product key (also referred to as a "license key") used to download an object file of the native application is set.

The shortcut destination URL setting field G150 is used, when "Web" is selected in the application type setting field G120, to set a URL (shortcut destination URL) of the web application server 50 providing the web application.

The icon image setting field G160 is used when "Web" is selected in the application type setting field G120, and an icon image of a shortcut icon for using the web application is set. The user can delete the icon image once set by pressing an icon delete button G161 after the icon image is set with the icon image setting field G160.

In the support model setting field G170, one or more models (for example, a model number) of the image processing apparatus 10 with which the application, which is to be introduced on the application market site, is available are selected. In the required firmware setting field G180, a version of the firmware required for using the application to be introduced on the application market site is set.

For example, in the example of FIG. 7, "FWVer 2.5" is set in the required firmware version setting field G180. This means that if the version of the firmware is "FWVer 2.5" or more (newer) than "FWVer 2.5", the application can be used.

The user of the terminal device 20 can perform the application registration process by setting various information in each of the above-described setting fields and pressing an OK button G190. In the following description, it is assumed that "Web" is selected in the application type setting field G120, and then an application registration process (that is, an application registration process of registering the web application with the application market server 30) is performed.

The application registration screen G100 illustrated in FIG. 7 is an example, and various other setting fields may be included in the application registration screen G100. For example, the application registration screen G100 may include a setting field with which a description of an application to be displayed on the application market site can be set. In addition, the application registration screen G100 may include, for example, a setting field that can set a country or a region (for example, the United States, Japan etc.) in which an application can be introduced may be included.

Referring again to FIG. 6, the input reception unit 512 of the browser 510 receives the application registration operation (Step S104).

Then, the request unit 513 of the browser 510 transmits an application registration request to the application market server 30 (Step S105). The application registration request includes various information, for example, information set in each setting failed on the application registration screen G100 illustrated in FIG. 7 (for example, an application name, an application type, a product ID, a shortcut destination URL, an icon image, a support model, a required firmware version, etc.).

Upon receiving the application registration request, the application registration unit 620 of the application market server 30 registers the application according to the registration request (Step S106). That is, the application registration unit 620 generates application information based on the various information included in the registration request and stores the generated application information in the application information storage unit 630. By storing the application information in the application information storage unit 630, the application introduced on the application market site is registered in the application market server 30.

Then, the application registration unit 620 of the application market server 30 transmits a registration result to the terminal device 20.

A description is now given of the application information stored in the application information storage unit 630, with reference to FIG. 8. FIG. 8 is a conceptual diagram illustrating an example of the application information, according to the embodiment.

As illustrated in FIG. 8, the application information stored in the application information storage unit 630 includes a product ID, an application name, an application type, a product key, a shortcut destination URL, an icon image, a support model, and a required firmware version. Each of the above-mentioned items of the information is set by the user on the application registration screen G100 illustrated in FIG. 7, for example.

As described above, the product key is set when the application type is "Native". In addition, the shortcut destination URL and the icon image are set when the application type is "Web".

In addition, for example, when the application type is "Native", the required firmware version may not be set in the application information. This is because, in the case of the native application, the required firmware version can be described in the object file, for example.

As described above, in the image processing system 1 according to the embodiment, for example, a person in charge in the third vendor can register an application (native application or web application) with the application market server 30 using the terminal device 20. When the application is registered with the application market server 30, the application is introduced on the application market site and can be installed on, or added to, the image processing apparatus 10.

In the embodiment, the application is registered with the application market server 30 using the browser 510 installed on the terminal device 20, however, dedicated software (for example, an application registration tool or the like) may be used, for example.

Process of Installing Web Application

Figure 9A:
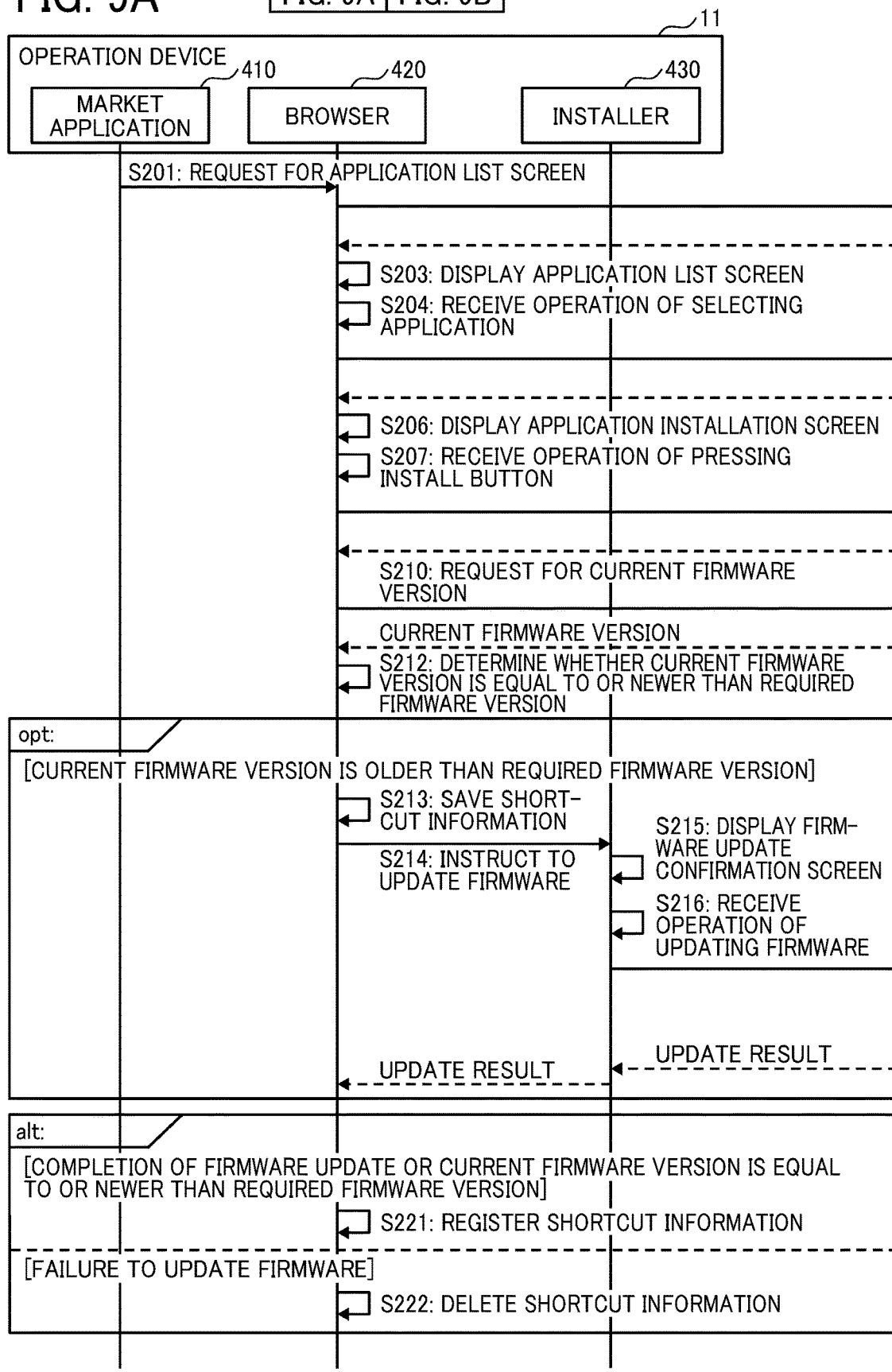
FIG. 9A and FIG. 9B are a sequence diagram illustrating alt example of process of installing a web application, according to one of the embodiments of the disclosure.
Figure 9B:
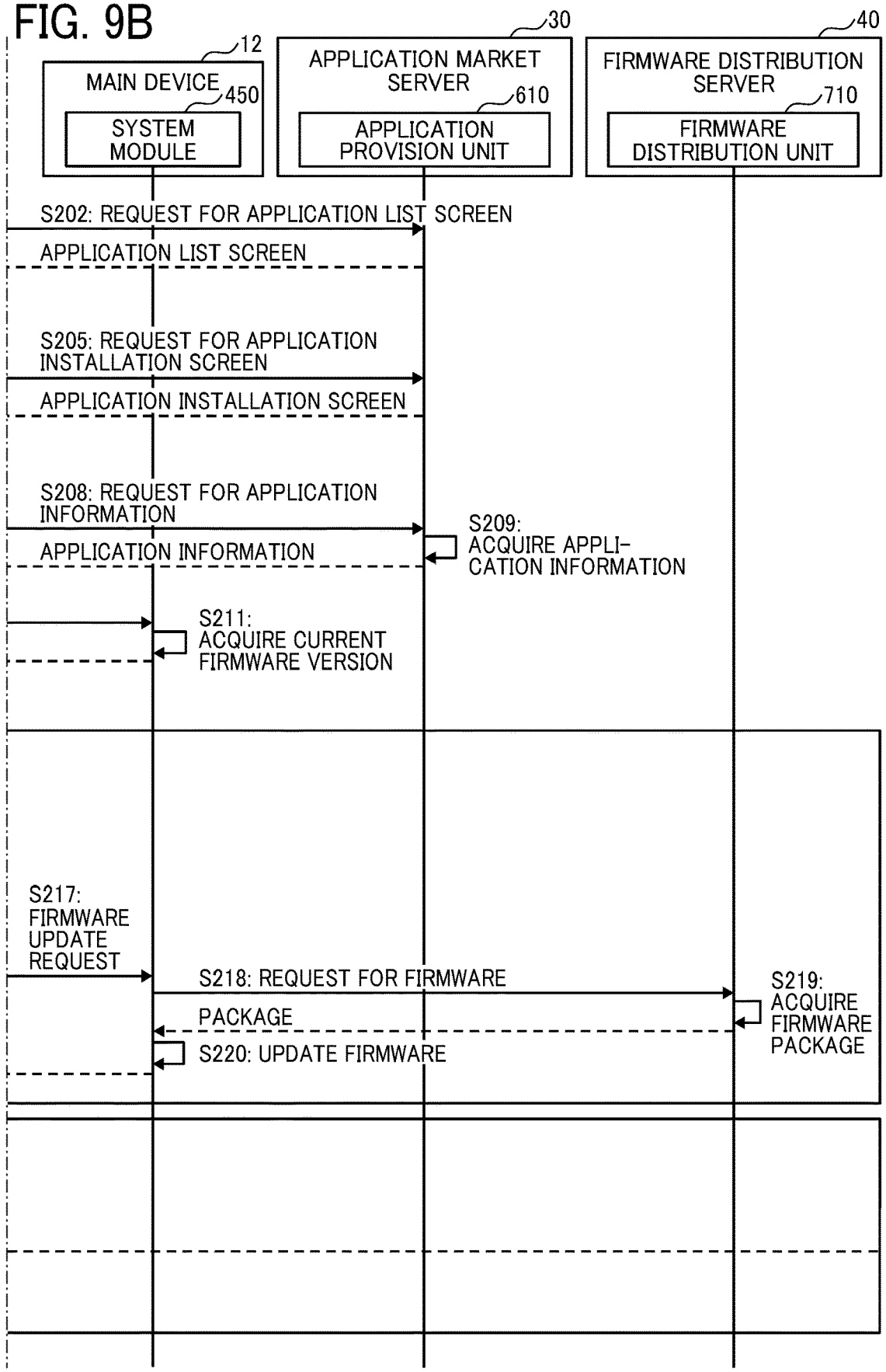

A description is now given of a process of installing, or adding, a web application introduced on the application market site on, or to, the image processing apparatus 10, with reference to FIG. 9A and FIG. 9B.

FIG. 9A and FIG. 9B is a sequence diagram illustrating an example of process of installing, or adding, a web application according to the embodiment.

The site display request unit 411 of the market application 410 transmits, to the browser 420, a display request for displaying an application list screen including an application list in which applications introduced on the application market site are listed (Step S201). The site display request unit 411 transmits the display request for displaying an application list screen to the browser 420 in response to activation of the market application 410, for example. The activation of the market application 410 can be performed, for example, by the user selecting an icon for starting use of the market application 410 from the icons displayed on the control panel 115.

Then, the request unit 423 of the browser 420 transmits the display request for displaying an application list screen to the application market server 30 (Step S202). The display request for displaying an application list screen is, for example, an HTTP request in which a URL of the application list screen is identified.

Then, the application provision unit 610 of the application market server 30 transmits an application list screen to the image processing apparatus 10 as web content. The application list screen is transmitted to the image processing apparatus 10, for example, as an HTTP response.

Figure 10A:
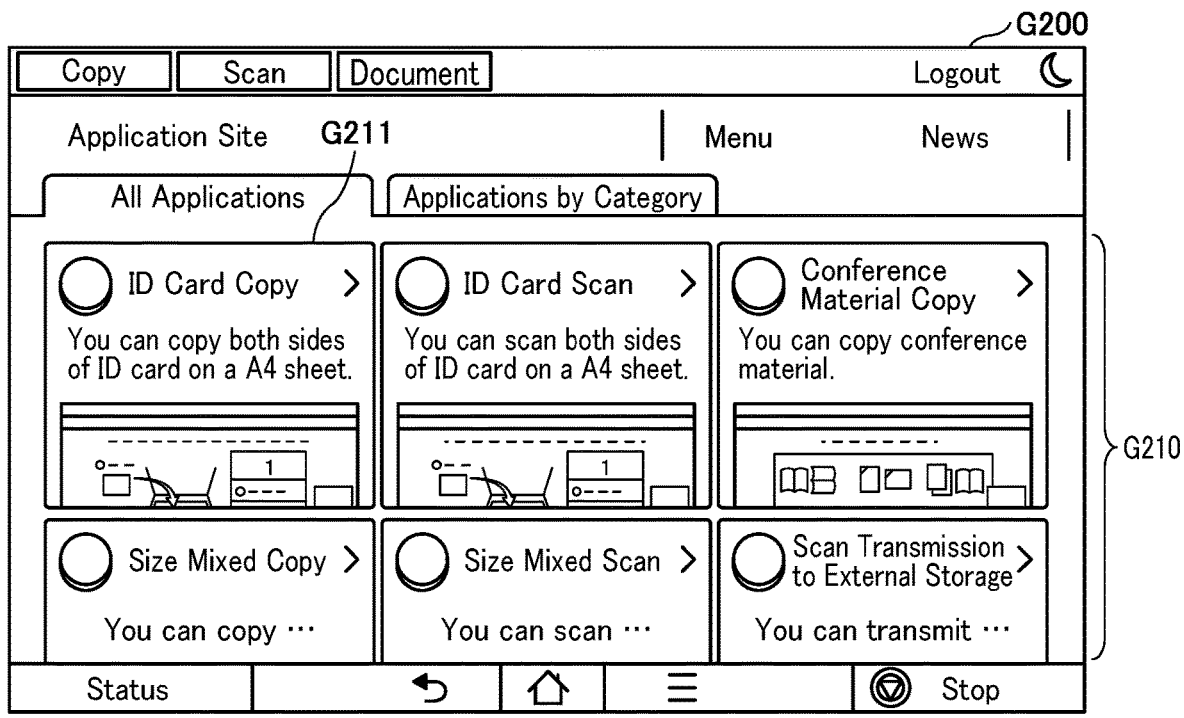
FIG. 10A is an illustration of an application list screen, according to one of the embodiments of the disclosure.

Then, the display control unit 421 of the browser 420 interprets the application list screen transmitted from the application market server 30 and displays, for example, an application list screen G200 as illustrated in FIG. 10A (Step S203).

The application list screen G200 illustrated in FIG. 10A is a screen for displaying an application list in which applications introduced on the application market site are listed. The application list screen G200 illustrated in FIG. 10A includes an application list G210. The user can select a desired application to be installed on, or added to, the image processing apparatus 10 by selecting an icon indicating the application from the application list G210. Hereinafter, this operation may be referred to as an application selection operation. In the following description of the example here, it is assumed that the user selects an icon G211 indicating a web application having an application name of "ID Card Copy", as an application selection operation.

The input reception unit 422 of the browser 420 receives the application selection operation (Step S204).

Then, the request unit 423 of the browser 420 transmits, to the application market server 30, a display request for displaying an application installation screen for installing the selected application (in the embodiment, the web application having the application name of "ID Card Copy") (Step S205). The display request for displaying an application installation screen is, for example, an HTTP request in which a URL of the application installation screen is identified.

Then, the application provision unit 610 of the application market server 30 transmits an application installation screen that is used for installing the web application having the application name of "ID Card Copy", to the image processing apparatus 10 as web content. The application installation screen is transmitted to the image processing apparatus 10, for example, as an HTTP response.

Figure 10B:
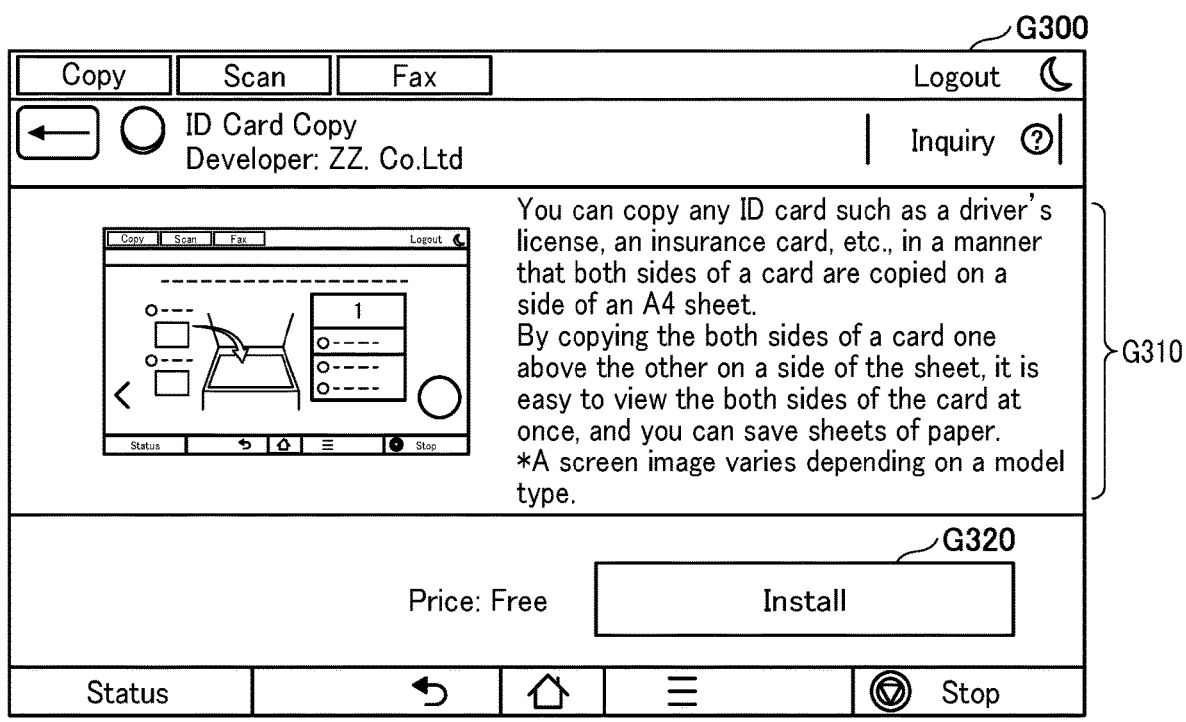
FIG. 10B is an illustration of an application installation screen, according to one of the embodiments of the disclosure.

Then, the display control unit 421 of the browser 420 interprets the application installation screen transmitted from the application market server 30 and displays, for example, an application installation screen G300 as illustrated in FIG. 10B (Step S206).

The application installation screen G300 illustrated in FIG. 10B is a screen for installing, or adding, the web application having the application name of "ID Card Copy" on, or to, the image processing apparatus 10. The application installation screen G300 illustrated in FIG. 10B includes a description G310 of the web application and an install button G320 for starting installation of the web application on the image processing apparatus 10. In the description G310 of the web application, the outline etc. of the web application is described. By pressing the install button G320, the user can install the web application on the image processing apparatus 10. In the following description of the embodiment, it is assumed that the user presses install button G320.

In addition, in a case in which a native application is selected, an install button in the application installation screen G300 is designed to call an application program interface (API) provided by the browser 420 to cause the browser 420 to cause the installer of the image processing apparatus 10 to operate to download and install the object file of the application. In addition, in a case in which a web application is selected, an install button included in the application installation screen G300 is designated to call an API provided by the browser 420 to cause the browser 420 to acquire, from a server, information on a required firmware version required to use the application with the image processing apparatus 10, to determine whether a current version of the firmware of the image processing apparatus 10 is equal to or newer than a required firmware version indicated by the information acquired from the server, to instruct to updated the firmware if the firmware is required to be updated, and to add a shortcut of the web application on a home screen. In other words, the design of the install button for a native application and the design of the install button for a web application on the application installation screen are different from each other so as to call the different API provided by the browser 420, when being operated.

In the application installation screen G300 illustrated in FIG. 10B, "Install" is displayed on the button (install button G320) for starting installation of the web application on the image processing apparatus 10. By displaying "Install" on the button as described above, namely displaying the button on which "Install" is displayed even in the case of adding the web application by registering a shortcut icon, the user of the image processing apparatus 10 can install an application on the image processing apparatus 10 without caring about an application type (native application or web application).

Alternatively, instead of "Install", for example, "Introduce", "Obtain", "Register", "Start Using", "Use," etc., which represent "Starting Installation", may be displayed on the button for stating installing the web application.

The input reception unit 422 of the browser 420 receives an operation to the install button G320 (Step S207).

Then, the request unit 423 of the browser 420 transmits, to the application market server 30, an acquisition request for acquiring application information on the selected application (in the embodiment, the selected application is the web application having the application name of "ID Card Copy") (Step S208). The application information acquisition request includes, for example, information (for example, a product ID) that identifies the selected application (that is, the web application having the application name of "ID Card Copy").

The application provision unit 610 of the application market server 30 acquires the application information (that is, application information on the web application having the application name of "ID Card Copy") from the application information storage unit 630 (Step S209). In addition, the application provision unit 610 may acquire information that is identified by the acquisition request (for example, application information identified by the product ID) from the application information stored in the application information storage unit 630, for example.

Then, the application provision unit 610 of the application market server 30 transmits the acquired application information to the image processing apparatus 10. As described above, the application information of which the application type is "Web" (namely, web application) includes, for example, an application name, a shortcut destination URL, an icon image, and a required firmware version.

When the application information is transmitted from the application market server 30, the request unit 423 of the browser 420 transmits a request to acquire a current version of the firmware (that is, the current version of the firmware of the image processing apparatus 10) to the main device 12 (Step S210). In addition, the request unit 423 can use an API provided by the system module 450 of the main device 12 to request for the current version of the firmware, for example. In addition, the request unit 423 requests for the current version of the firmware using the API provided by the browser 420 when the required version of the firmware included in the application information is transmitted to the browser 420, for example.

The version acquisition unit 451 of the system module 450 acquires information indicating the current version of the firmware of the image processing apparatus 10 from the firmware version storage unit 460 (Step S211).

Then, the version acquisition unit 451 of the system module 450 transmits information indicating the acquired version (hereinafter, also referred to as a "current firmware version" or a "current version of the firmware") to the operation device 11.

Then, the version determination unit 424 of the browser 420 determines whether the current version of the firmware transmitted in Step S211 described above is equal to or newer than the required firmware version included in the application information transmitted in Step S209 described above (Step S212).

When the current version of the firmware is determined not to be equal to or newer than the required firmware version, the following processing of Step S213 to Step S220 is executed. On the other hand, when the current version of the firmware is determined to be equal to or newer than the required firmware version, the following processing of Step S213 to Step S220 is not executed.

If the current version of the firmware is determined not to be equal to or newer than the required firmware version, the shortcut storing unit 426 of the browser 420 stores the shortcut information in the shortcut storage unit 440 (Step S213). The shortcut information is information required for registering a shortcut icon for using the web application, and is, for example, an icon image and a shortcut destination URL included in the application information.

The reason why the shortcut information is stored in the shortcut storage unit 440 is that restarting of the operation device 11 and restarting of the main device 12 are required after updating the firmware in Step S220, which is described later.

Then, the update instruction unit 425 of the browser 420 transmits a firmware update instruction to the installer 430 (Step S214).

Figure 11A:
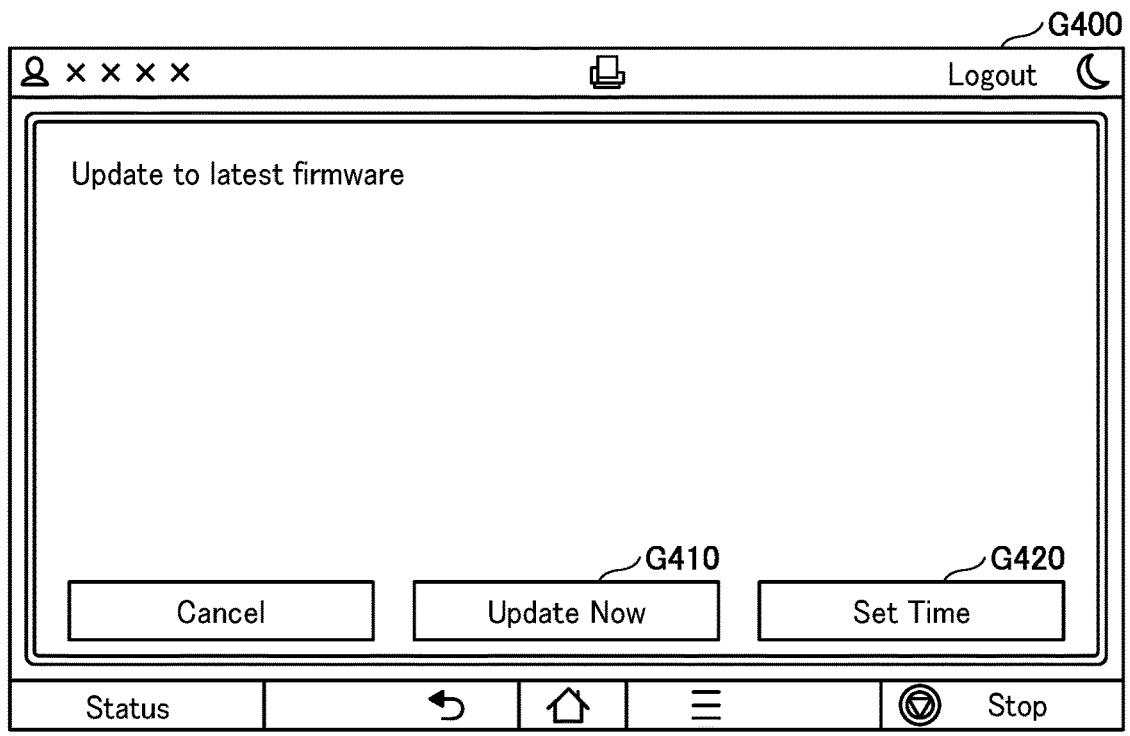
FIG. 11A is an illustration of a firmware update confirmation screen, according to one of the embodiments of the disclosure.

Then, the update request unit 431 of the installer 430 displays, for example, the firmware update confirmation screen G400 as illustrated in FIG. 11A (Step S215).

The firmware update confirmation screen G400 illustrated in FIG. 11A is a screen for allowing the user to confirm whether or not to update the firmware. The firmware update confirmation screen G400 illustrated in FIG. 11A includes a "Update Now" button G410. The user can update the firmware by pressing the "Update Now" button G410. In the following description, it is assumed that the firmware is updated.

Figure 11B:
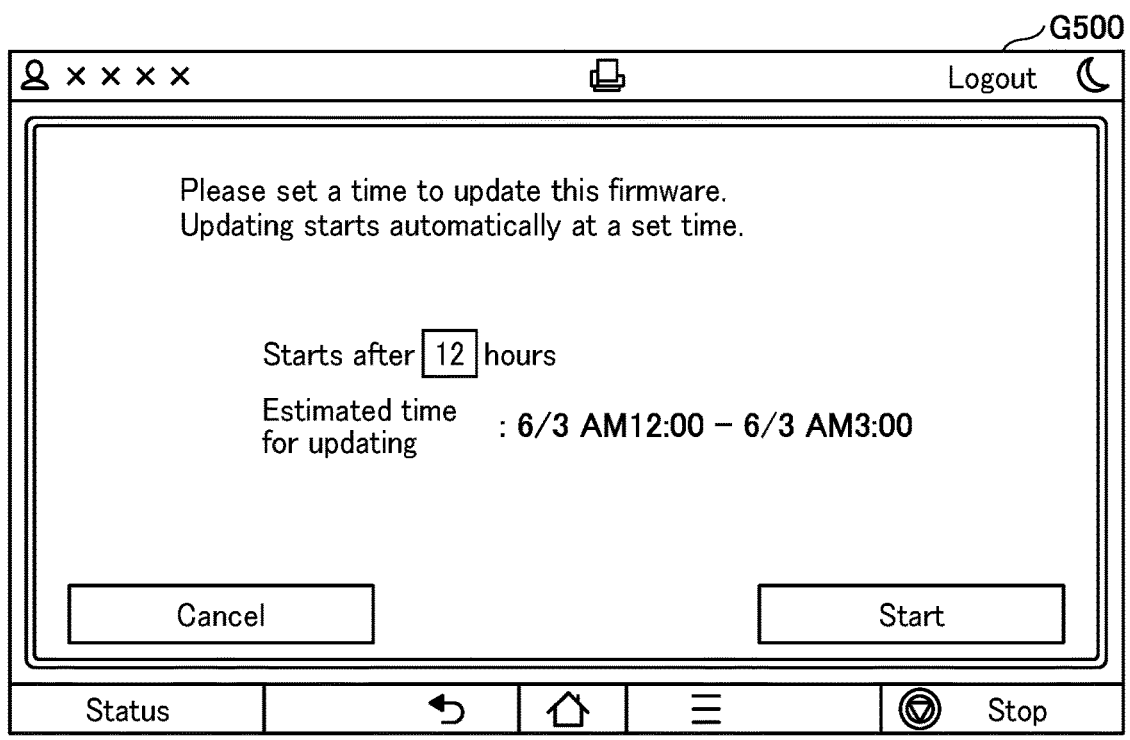
FIG. 11B is an illustration of a time setting screen, according to one of the embodiments of the disclosure.

In addition, the firmware update confirmation screen G400 illustrated in FIG. 11A includes a "Set Time" button G420. When the "Set Time" button G420 is pressed, the update request unit 431 displays, for example, a time setting screen G500 as illustrated in FIG. 11B. In the time setting screen G500 illustrated in FIG. 11B, a time to update the firmware can be set. Thus, the user can update the firmware at a desired tune (for example, a time during which the user does not use the image processing apparatus 10 such as a nighttime). If an operation for installing another different web application is performed before the time set by the user, the web application and the different application are concurrently installed on the image processing apparatus 10 after the firmware is updated.

The update request unit 431 of the installer 430 receives a firmware updating operation (Step S216).

Then, the update request unit 431 of the installer 430 transmits the firmware update request to the main device 12 (Step S217). The update request unit 431 can use the web API provided by the system module 450 of the main device 12 to request for the firmware update, for example.

Then, the firmware acquisition unit 452 of the system module 450 transmits a request for firmware (firmware acquisition request) to the firmware distribution server 40 (Step S218).

Then, the firmware distribution unit 710 of the firmware distribution server 40 acquires a package of the latest version of the firmware from the package storage unit 720 (Step S219).

Then, the firmware distribution unit 710 of the firmware distribution server 40 transmits the acquired package to the main device 12.

The firmware update unit 453 of the system module 450 updates the first firmware of the operation device 11 and the second firmware of the main device 12 with the package transmitted from the firmware distribution server 40 (Step S220).

The firmware update unit 453 updates the second firmware of the main device 12 with the latest version of the second firmware included in the package, and then updates the first firmware of the operation device 11 with the latest version of the first firmware included in the package, for example. After updating the firmware of the operation device 11 and the main device 12, the firmware update unit 453 restarts the operation device 11 and then restarts the main device 12. As a result, the firmware of the image processing apparatus 10 is updated to the latest version. When the package transmitted from the firmware distribution server 40 is compressed, the firm update unit 453 decompresses the package and updates the firmware.

Then, the firmware update unit 453 of the system module 450 transmits the result of the firmware update to the browser 420 via the installer 430.

The processing of Step S221 is executed when the firmware update in Step S220 succeeds or when the current version of the firmware is determined to be equal to or newer than the required firmware version in Step S212. That is, in this case, the shortcut registration unit 427 of the browser 420 acquires the shortcut information stored in the shortcut storage unit 440 and registers the shortcut icon with the operation device 11 using the acquired shortcut information (Step S221). As a result, the shortcut icon for using the web application is registered with the operation device 11, and the web application is installed on the image processing apparatus 10.

Figure 12A:
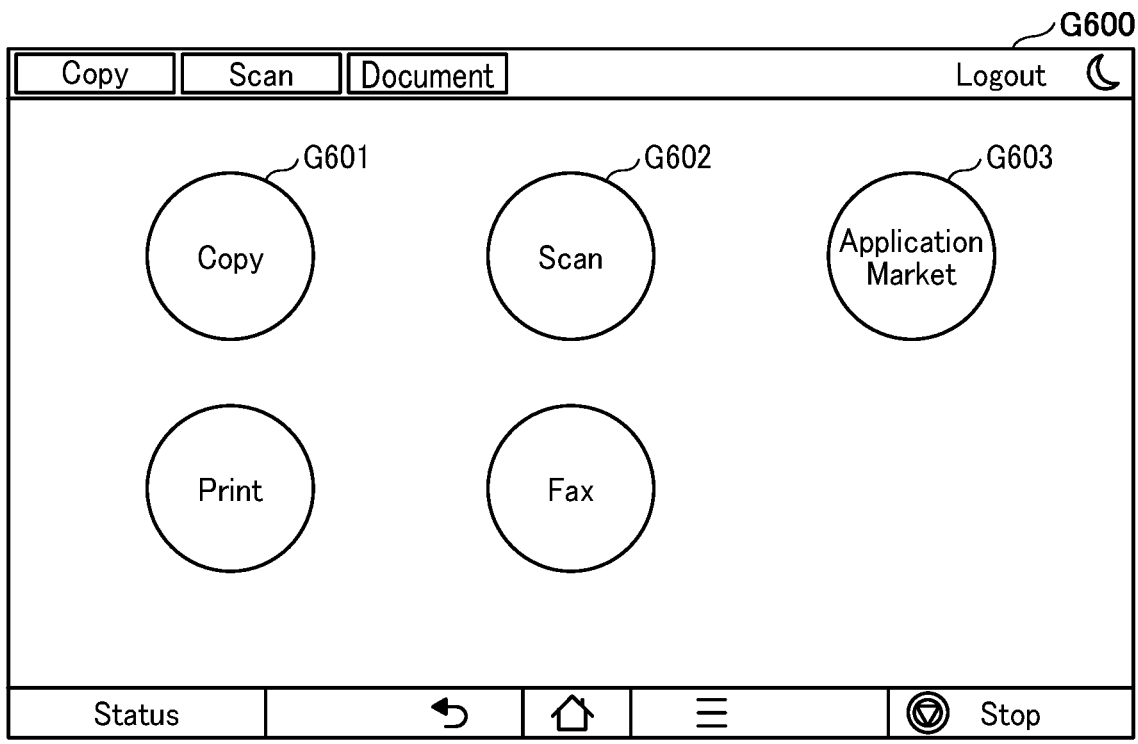
FIG. 12A is an illustration of an example of an application use screen before a web application is added, according to one of the embodiments of the disclosure.
Figure 12B:
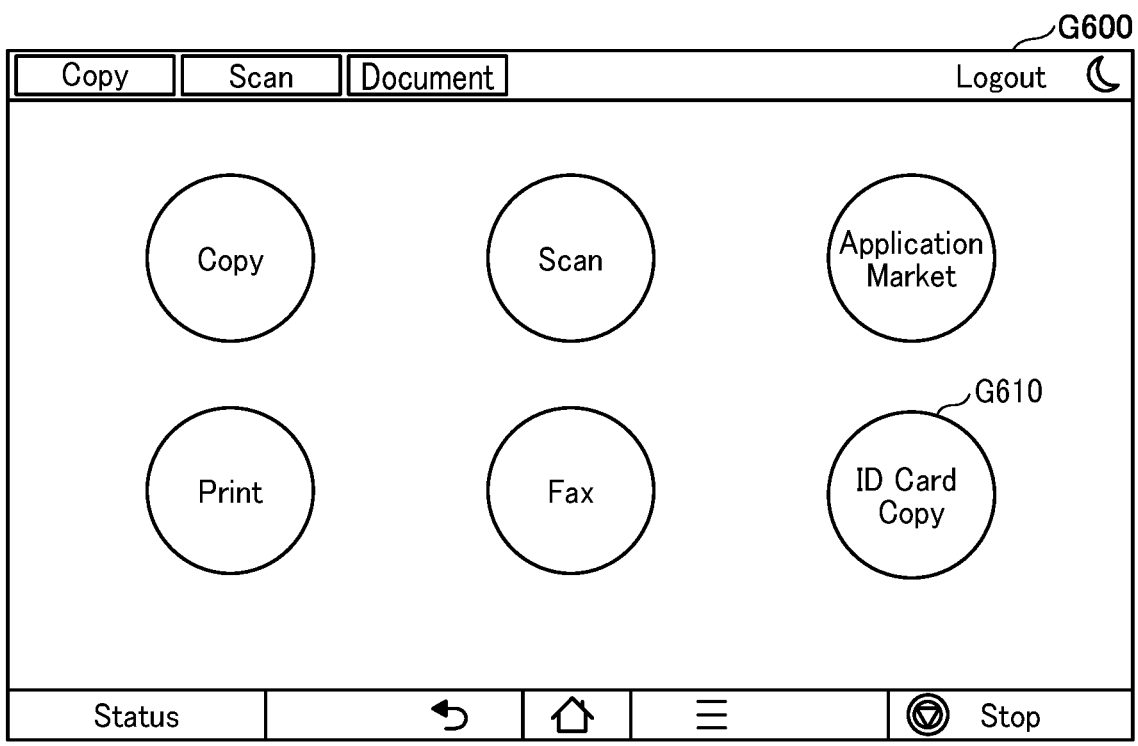
FIG. 12B is an illustration of an example of an application use screen after a web application is added, according to one of the embodiments of the disclosure.

FIG. 12A and FIG. 12B are illustrations of examples of an application use screen G600. FIG. 12A is the illustration of the application use screen G600 displayed on the operation device 11 before the web application is installed on the image processing apparatus 10. FIG. 12B is the illustration of the application use screen G600 displayed on the operation device 11 after the web application is installed on the image processing apparatus 10.

As illustrated in FIG. 12A, the application use screen G600 includes a "Copy" icon G601 for using a copy application, a "Scan" icon G602 for using a scan application, and an "Application Market" icon G603 for using the market application 410, for example.

When the web application having the application name of "ID Card Copy" is installed on the image processing apparatus 10, a shortcut icon G610 for using the web application is added to the application use screen G600, as illustrated in FIG. 12B. By pressing the shortcut icon G610, the user can use the web application provided by the web application server 50 of the shortcut destination URL indicated by the shortcut icon G610 using the browser 420. The application use screen G600 is a screen that is initially displayed when the user starts using the image processing apparatus 10 (for example, when the user logs in), and is also referred to as a home screen.

Referring again to FIG. 9 (FIG. 9A and FIG. 9B), the processing of Step S222 is executed when the firmware fails to be updated in Step S220. That is, in this case, the shortcut deletion unit 428 of the browser 420 deletes the shortcut information stored in the shortcut storage unit 440 (Step S222).

As described above, in the image processing system 1 according to the embodiment, when installing a web application from the application market site, the image processing apparatus 10 determines whether a current version of the firmware of the image processing apparatus 10 is a version that is required for using the web application or not. In addition, in the image processing system 1 according to the embodiment, when the current version of the firmware of the image processing apparatus 10 is determined not to be the version required for using the web application, the current version of the firmware of the image processing apparatus 10 is updated to the latest version of the firmware of the image processing apparatus 10.

According to one of the embodiment as described above, the inconvenience in using a web application required to update the firmware of the electronic apparatus can be reduced. For example, an inconvenient situation in which a service engineer is required to visit a place where the electronic apparatus is installed to update the firmware of the electronic apparatus to use an application is prevented. This allows the user to use the application without waiting for the service engineer to update the firmware.

As described above, in the image processing system 1 according to the present embodiment, for example, to install a web application, a service engineer is not necessary to update the firmware of the image processing apparatus 10, resulting in reduction of the time to wait until the user can use the web application. In addition, the image processing system 1 according to the present embodiment can prevent a situation in which a web application is not available because a current version of the firmware of the image processing apparatus 10 is not a version required to use the web application. Furthermore, the user can update the firmware at a time of registering a web application or at a time set by the user, and the user can use the web application smoothly without waiting for updating of the firmware, accordingly. Therefore, according to the image processing system 1 according to the embodiment, it is possible to improve the convenience when the user installs a web application on the image processing apparatus 10 and uses the web application.

In the embodiment described above, the web application is described as an example of an application that does not include an object file, but the embodiments of the disclosure are not limited to this. The embodiment can be applied to an application in the same or similar way, as long as the application is registered with an electronic apparatus, such as an MFP, from an application server for use, or as long as the application does not include firmware information.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Although the embodiments of the disclosure have been described and illustrated above, such description is not intended to limit the disclosure to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An electronic apparatus, communicably connected to a server, the electronic apparatus comprising:
   circuitry configured to
      display, on a display, an application list based on web content acquired from the server, the application list being a list of a plurality of applications available with the electronic apparatus, the plurality of applications including at least a web application;
      acquire first version information from the server, the first version information indicating a version of firmware required for the electronic apparatus to use the web application included in the application list displayed on the display, wherein the circuitry is further configured to acquire, from the server, the first version information indicating the version of the firmware required to use the web application, when a display component is selected according to a user operation, without requiring installation of the web application;
      determine whether second version information is equal to or newer than the first version information acquired from the server, the second version information indicating a current version of firmware installed on the electronic apparatus; and
      update the firmware of the electronic apparatus in response to a determination indicating that the second version information is older than the first version information.

2. The electronic apparatus of claim 1,
   wherein the circuitry is further configured to acquire the first version information from the server when information to use the web application is registered with the electronic apparatus, via the application list displayed.

3. The electronic apparatus of claim 2,
   wherein the information to use the web application is one of address information on the web application and image information representing a display component associated with the address information, and
   wherein one of the address information and the image information is registered with the electronic apparatus after the circuitry determines whether the second version information is equal to or newer than the first version information acquired from the server.

4. The electronic apparatus of claim 3, further comprising a memory to store at least one of the address information and the image information representing the display component in response to a determination indicating that the second version information is older than the first version information, and
   wherein the circuitry is further configured to delete the at least one of the address information and the image information from the memory when the firmware is not updated after the at least one of the address information and the image information is stored.

5. The electronic apparatus of claim 3,
   wherein, when the firmware is updated, the circuitry is further configured to register the display component to be displayed on a screen that is displayed after restarting the electronic apparatus, the screen being used to select a function to be used with the electronic apparatus according to a user operation.

6. The electronic apparatus of claim 1, wherein the circuitry is further configured to update the firmware at a time set according to a user operation.

7. The electronic apparatus of claim 1, wherein the circuitry is further configured to display the display component, which indicates that the web application has been added to the electronic apparatus, on one of a screen displaying the application list and a screen displayed after the web application is selected from the application list.

8. The electronic apparatus of claim 1, further comprising:
   an operation device configured to be operated according to a user operation; and
   a main device configured to provide an image processing function,
   wherein the firmware includes first firmware installed on the operation device and second firmware installed on the main device, and
   wherein the circuitry is further configured to update the first firmware and the second firmware.

9. The electronic apparatus of claim 8,
   wherein the operation device includes a web browser configured to operate on a first operating system of the operation device, the web browser being configured to
      display the application list in which the plurality of applications available with the electronic apparatus are listed,
      receive a user input to use a web application with the electronic apparatus via the application list,
      in response to a determination indicating that the firmware of the electronic apparatus is to be updated, instruct the circuitry to update the firmware of the electronic apparatus and to register information to use the web application with the electronic apparatus.

10. The electronic apparatus of claim 1, wherein the circuitry is further configured to acquire the version of the firmware from the server in response to the user operation, which is selection of an install button.

11. An information processing system, comprising:
    at least one server; and
    an electronic apparatus communicably connected to the at least one server configured to enable the electronic apparatus to use applications including at least a web application, the electronic apparatus including circuitry configured to
       display, on a display, an application list based on web content acquired from the server, the application list being a list of a plurality of applications available with the electronic apparatus, the plurality of applications including at least a web application;
       acquire first version information from the server, the first version information indicating a version of firmware required for the electronic apparatus to use the web application included in the application list displayed, wherein the circuitry is further configured to acquire, from the at least one server, the first version information indicating the version of the firmware required to use the web application, when a display component is selected according to a user operation, without requiring installation of the web application;
       determine whether second version information is equal to or newer than the first version information acquired from the server, the second version information indicating a current version of firmware installed on the electronic apparatus; and update the firmware of the electronic apparatus in response to a determination indicating that the second version information is older than the first version information.

12. A method of processing information, comprising:

displaying an application list based on web content acquired from a server, the application list being a list of a plurality of applications available with an electronic apparatus, the plurality of applications including at least a web application;

acquiring first version information from the server, the first version information indicating a version of firmware required for the electronic apparatus to use the web application included in the application list displayed, wherein the acquiring step includes acquiring, from the server, the first version information indicating the version of the firmware required to use the web application, when a display component is selected according to a user operation, without requiring installation of the web application;

determining whether second version information is equal to or newer than the first version information acquired from the server, the second version information indicating a current version of firmware installed on the electronic apparatus; and updating the firmware of the electronic apparatus in response to a determination indicating that the second version information is older than the first version information.

* * * * *